Pierce & Button.
Oil Tank.
No. 2,718. Reissued Aug. 6, 1867.
Fig. 1.
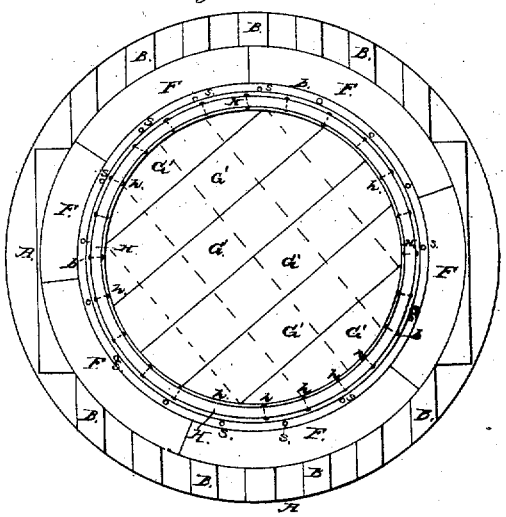
Fig. 2.
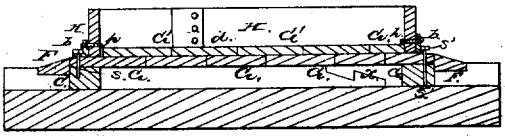
Fig. 3.
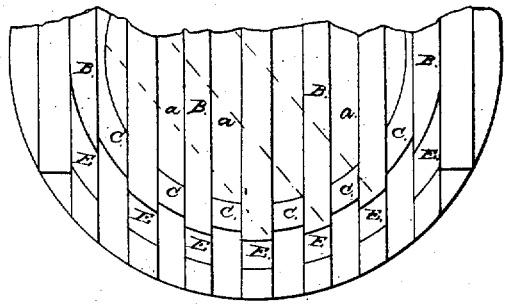
Fig. 4.
Witnesses.
W. D. Lewis
M. A. Lewis
Inventor:
J. B. Button
by his attorneys
Bakewell & Christy.
N. PETERS, PHOTO-LITHOGRAPHER, WASHINGTON, D. C.

UNITED STATES PATENT OFFICE.

JOHN B. BUTTON, OF CLEVELAND, OHIO, ASSIGNEE OF H. PIERCE AND J. B. BUTTON, OF SAME PLACE.

IMPROVEMENT IN OIL-TANKS.

Specification forming part of Letters Patent No. 61,453, dated January 22, 1867; Reissue No. 2,718, dated August 6, 1867.

*To all whom it may concern:*

Be it known that HIRAM PIERCE and J. B. BUTTON, of Cleveland, in the county of Cuyahoga and State of Ohio, have invented certain new and useful Improvements in Oil-Tanks; and I, the said J. B. BUTTON, (to whom the said HIRAM PIERCE has assigned all his interest therein,) do hereby declare that the following is a full, clear, and exact description of the said invention, reference being had to the accompanying drawings, forming part of this specification, in which—

Figure 1 is a top view of the improved tank. Fig. 2 is a transverse vertical section through Fig. 1. Fig. 3 represents the sills on which the tank is supported, the flooring and tank-bottom being removed to exhibit the arrangement of the sills and keys. Fig. 4 is a cross-section of one of the keys placed between the sills.

In the several figures like letters denote similar parts.

The invention relates to the construction of the wooden bottom of oil-tanks and the mode of connecting and attaching the body of the tank to the tank-bottom and its foundation.

In the construction of metallic tanks having wooden bottoms for the purpose of holding petroleum it has been found very difficult so to construct and attach the bottom to the body of the tank as to resist the strain of the contained oil and prevent the tank from leaking at the bottom, where the body is united thereto, and also to make a tight joint and yet leave room for the insertion of the necessary calking.

The ordinary mode of constructing tank-bottoms is to make a floor or bottom of wood by timbers or plank placed close together, and to make a circular groove in this bottom wide enough just to receive the lower end of the body of the tank, which is then fastened to the bottom by braces or angle-irons. This method, however, is ineffectual, as no sufficient space can be left to insert the calking. The great weight of the body of the tank, when filled with oil, requires that some means be adopted for securing a more firm and close union between the bottom and the body, combined with sufficient resistance to outward pressure exerted against the side of the tank. The invention is designed to secure these objects.

To enable others skilled in the art to make the improved tank, I will proceed to describe the construction and operation of our invention.

The timbers or sills B B, &c., are placed upon a foundation, A, of any suitable material, or upon the ground. These sills are square and placed parallel to each other about their own width apart. In order to brace the sills B B and preserve their relative position, as well as for the purpose of providing an unbroken support for the flooring immediately under the sides of the tank, we use keys C, which may be rectangular in section, or broader at bottom than at top, with beveled sides, as shown in Fig. 4. Each of these keys C is so shaped, as seen in Fig. 3, as to fit in between two sills B B and form a circle under the body of the cylindrical tank H. When made of the shape shown in Fig. 4, the keys C are placed with the broader side downward, and the adjoining sides of the sills B B are also beveled to conform to the shape of the keys, so that when the screws or bolts *i*, Fig. 2, are screwed up they will tend to draw the keys C C upward between the sills B B, and thus prevent their displacement. The keys C are not absolutely necessary, however.

Near each extremity of each of the sills is cut a recess, E, in the upper face of the sill, the inner edge of each such recess being in the line of a circle concentric with the body of the tank, as shown in Fig. 2, and at or near the inner line of the keys C. These recesses E E in the sills are made to receive the abutment-blocks F, which are pieces cut to the curve of an arc of a circle, and which, fitting into the recesses E E, surround the bottom of the tank H at a slight distance from it, and project above the surface of the sills far enough to cover the ends of the plank G, forming the lower course or flooring on which the tank H rests. This lower course of plank is laid at an angle of about forty-five degrees to the edge of the sills B B, so as to give to each plank a bearing on several of the sills, as shown by dotted lines *a a* in Fig. 3, and so that the plank G′, forming the floor of the tank H, being laid at right angles to the lower course, G, may likewise have a bearing across the sills B B, as shown in Fig. 1. The edges of the lower course of plank fit closely against the projecting faces of the abutment-blocks F F, as seen in Fig. 2. The flooring-plank G are spiked or nailed down to the sills B B.

In case any of the sills B B should not be long enough to extend across the tank and project beyond it on both sides, they may be pieced by a scarf, as shown at *x* in Fig. 2.

The tank-body H—a cylinder made of plates of sheet-iron riveted together and seamed—(the height being such as may be desired) is then placed upon the plank flooring G, so as to be over the circle formed by the keys C C, if keys are used, and it is secured in position by means of the angle-irons *b*, which are riveted to the sides of the tank H at *h*, and also bolted down by bolts or screws *s*, passing through the plank G and entering the sills B or keys C, as the case may be; or, if preferred, the bolts may pass through the sills B B, as at *s′* in Fig. 2. The joints and seams of the floor G and the joints around the lower edge of the tank H are then calked and paid over with coal-tar or other suitable substance. If desired, a layer of felting, *d*, is laid on top of the lower course of plank, G, and close up to the sides of the tank, although this may be dispensed with. On the first course of plank or flooring G, and over the felting *d*, if that be used, a second course of plank, G′, forming the bottom of the tank H, is then laid inside of the tank-body, with their ends not quite touching the sides of the tank, but leaving room between the ends of the plank forming the bottom and the tank H for calking, which is carefully inserted. The joints or seams between the planks forming the bottom G′ are also calked; and these planks G′ are spiked or nailed down to the sills, the spikes extending through the flooring-plank G, if a floor under the bottom G′ be used.

Although it is better to make use of the floor G, yet this may be dispensed with, and the tank-body being fastened by the angle-irons to the sills B B, the bottom formed by the planks G′ may be laid directly upon the sills B B, transversely thereto and within the tank H, the edges and seams being carefully calked.

The principal features of this improvement are the placing of the wooden bottom within the body of the tank, the bottom being secured to sills forming the foundation of the tank, to which sills the tank-body is itself rigidly attached, either directly or with an intervening floor; also, the abutment-pieces forming a rim around the foundation-floor, and serving to support the plank, and cause any strain from the tank to be distributed over the whole foundation; also, placing the foundation-floor and bottom of the tank and sills at such relative angles to each other as, when spiked together, to secure great strength and firmness.

The advantages of this construction are that it effectually overcomes the difficulty of inserting a wooden bottom into an iron tank, so as to be oil-tight, enabling the bottom to be calked without danger of giving way, the pressure being sustained by the angle-irons and the rim formed by the abutment-pieces.

Having thus described the improvement in oil-tanks, what I claim as the invention of HIRAM PIERCE and myself, and desire to secure by Letters Patent, is—

1. The wooden bottom of iron tanks for holding oil, when such wooden bottom is placed within the body of the tank, and spiked or otherwise secured to the sills which support the tank, and to which the body of the tank is also attached, either directly or with an intervening floor, substantially as hereinbefore described.

2. The rim or abutment-pieces F, inserted into recesses in the sills B B, for supporting the flooring of oil-tanks, substantially as hereinbefore described.

3. The combination of the foundation-sills B B, flooring G, with a metallic tank, H, bolted to the foundation, and an inserted wooden bottom, G′, also fastened to the foundation, constructed and arranged substantially as hereinbefore described.

In testimony whereof I, the said JOHN B. BUTTON, have hereunto set my hand.

J. B. BUTTON.

In presence of—
W. BAKEWELL,
WM. F. GRAHAM.